ACYLOXYMETALLOSULFOPHTHALATE CONTAINING DYEABLE POLYESTERS

Christian F. Horn, South Charleston, W. Va., assignor to Union Carbide Corporation, a corporation of New York
No Drawing. Filed Mar. 20, 1961, Ser. No. 96,674
10 Claims. (Cl. 260—75)

This invention relates to new condensation polymers. The invention also relates to fibers, filaments, yarns, films, and other structures of said polymers, which have an affinity for dyestuffs.

Linear polyesters are well known and are readily prepared by the reaction of dihydric alcohols or their functional derivatives with dibasic carboxylic acids, their ester forming derivatives, hydroxy carboxylic acids, and their polymer forming derivatives. The high molecular weight linear polyesters can be used, for example, to produce filaments, fibers, films, and the like. Of particular interest are the polyesters of terephthalic acid and its esters with glycols, such as, polyethylene terephthalate, and the polyester from dimethyl terephthalate and 1,4-cyclohexanedimethanol. However, the filamentous products produced from these polyesters have little affinity for dyestuffs by conventional dyeing procedures and consequently their utility in the fabric field is somewhat restricted.

It was to be expected that many efforts would be made to improve the dyeability of a film- and filament-forming material having as many desirable characteristics as those possessed by polyethylene terephthalate. Such efforts have indeed been made. Unfortunately, however, the efforts that have resulted in some degree of success in making polyethylene terephthalate more dyeable have done so only at the expense of degrading the polymer substantially with respect to its other characteristics. Thus, for example, a reported effort to improve the dyeability of polyethylene terephthalate by incorporating within its structure minor amounts of certain amino alcohols and thereby giving the polymer a greater ability to absorb acetate dyes and acid dyes, seriously reduces the heat stability of the polyethylene terephthalate so modified. Another effort in this direction involved chemical incorporation of long chain polyalkylene oxides having molecular weights of the order of 1000 to 6000. This modification of the polyethylene terephthalate unfortunately made it quite sensitive to air oxidation and to light. Another proposal involved the utilization of toxic carriers such as the chlorobenzenes, chlorophenols, and the like, for the dyeing process. Still another involved the application of vat or acetate dyes under superatmospheric pressure at temperatures above 100° C. Another required the use of fiber swelling agents or dye carriers. Still another involved the use of pigments that are mixed directly with the polyethylene terephthalate melt before spinning.

It is apparent that these efforts have had no or very limited success. The methods involving chemical incorporation of modifying agents such as amino alcohols and polyalkylene oxides have involved substantial reduction in thermal stability, the use of toxic carriers is inherently undesirable and dangerous, and special dyeing techniques, such as those requiring dyestuffs that are stable at high temperatures, are too expensive to be commercially practicable.

These difficulties have now been overcome without significantly impairing the characteristics of polyethylene terephthalate. Thus, for example, polyethylene terephthalate fibers and films made in accordance with the method of this invention are readily dyeable by ordinary dyeing techniques while at the same time retaining excellent heat stability, dimensional stability and strength.

The modified linear polyesters of this invention are produced from an aromatic dicarboxylic acid or an ester forming derivative thereof, with a diol, such as an alicyclic glycol, an aromatic diol, an aliphatic-aromatic diol, an aliphatic glycol or a diester of an aromatic diol, and a small amount of an acyloxymetallosulfoisophthalate or an acyloxy-metallosulfoterephthalate.

The acyloxymetallosulfophthalate compounds used to produce the modified dyeable polyesters of this invention are represented by the following general formula:

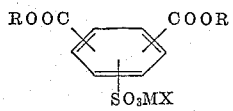

wherein R represents a hydrogen atom or an alkyl radical containing from 1 to about 10 carbon atoms; M represents a divalent metal atom, for example, beryllium, magnesium, calcium, zinc, strontium, barium, or tin; and X represents an acyloxy radical —OOCR′, wherein R′ represents a monovalent hydrocarbyl radical containing from 1 to about 15 carbon atoms, such as an alkyl radical, for example, methyl, ethyl, propyl, isopropyl, butyl, isobutyl, pentyl, hexyl, 2-methylpentyl, 2-ethylbutyl, heptyl, octyl, 2-ethylhexyl, decyl, dodecyl, pentadecyl, and the like, or an aryl radical for example, phenyl, naphthyl, and the like, or an alkaryl radical, for example, benzyl, phenethyl, and the like, or an aralkyl radical, for example, tolyl, xylyl, and the like.

Of particular interest are the 2-acyloxymetallosulfoterephthalic acid compounds represented by the general formula:

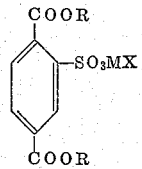

and the 5-acyloxymetallosulfoisophthalic acid compounds represented by the general formula:

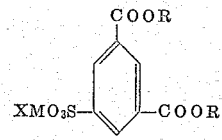

Illustrative of the acyloxymetallosulfoisophthalates and acyloxymetallosulfoterephthalates which can be used as modifiers to produce the linear polyesters of this invention one can mention:

2-acetoxyberylliumsulfoterephthalic acid,
2-acetoxymagnesiumsulfoterephthalic acid,
5-acetoxycalciumsulfoisophthalic acid,
2-acetoxyzincsulfoterephthalic acid,
2-acetoxystrontiumsulfoterephthalic acid,
5-acetoxyberylliumsulfoisophthalic acid,
5-acetoxybariumsulfoisophthalic acid,
5-acetoxystannoussulfoisophthalic acid,
2-acetoxybariumsulfoterephthalic acid,
2-acetoxycalciumsulfoterephthalic acid,
2-acetoxystannoussulfoterephthalic acid,
5-acetoxyzincsulfoisophthalic acid,
5-propionoxycalciumsulfoisophthalic acid,
2-propionoxymagnesiumsulfoterephthalic acid,
2-butanoyloxybariumsulfoterephthalic acid,
5-pentanoyloxystannoussulfoisophthalic acid,
2-hexanoyloxycalciumsulfoterephthalic acid,
2-heptanoyloxyzincsulfoterephthalic acid,
5-octanoyloxystannoussulfoisophthalic acid, 2-octanoyloxycalciumsulfoterephthalic acid,
2-decanoyloxybariumsulfoterephthalic acid,
2-dodecanoyloxymagnesiumsulfoterephthalic acid,
2-benzoyloxyzincsulfoterephthalic acid,
2-phenylacetoxystannoussulfoterephthalic acid,
2-toluyloxycalciumsulfoterephthalic acid,
Dimethyl 2-benzoyloxybariumsulfoterephthalate,
Dimethyl 2-actoxycalciumsulfoterephthalate,
Dimethyl 5-propionoxymagnesiumsulfoisophthalate,
Dimethyl 2-butanoyloxystrontiumsulfoterephthalate,
Dimethyl 5-pentanoyloxyzincsulfoisophthalate,
Dimethyl 5-hexanoyloxystannoussulfoisophthalate,
Dimethyl 2-heptanoyloxyzincsulfoterephthalate,
Dimethyl 2-octanoyloxyberylliumsulfoterephthalate,
Dimethyl 2-decanoyloxyberylliumsulfoterephthalate,
Dimethyl 5-pentadecanoyloxymagnesiumsulfoisophthalate,
Diethyl 5-acetoxyzincsulfoisophthalate,
Diethyl 5-isopropionoxycalciumsulfoisophthalate,
Diethyl 2-butanoyloxystannoussulfoterephthalate,
Diethyl 2-hexanoyloxystrontiumsulfoterephthalate,
Diethyl 5-octanoyloxycalciumsulfoisophthalate,
Diethyl 2-nonanoyloxybariumsulfoterephthalate,
Dipropyl 5-acetoxyzincsulfoisophthalate,
Diisopropyl 2-propionoxystannoussulfoterephthalate,
Dipropyl 2-butanoyloxymagnesiumsulfoterephthalate,
Dipropyl 5-hexanoyloxyzincsulfoisophthalate,
Diisopropyl 5-heptanoyloxycalciumsulfoisophthalate,
Dibutyl 5-acetoxystannoussulfoisophthalate,
Dibutyl 2-isopropionoxyzincsulfoterephthalate,
Dibutyl 5-butanoyloxycalciumsulfoisophthalate,
Dibutyl 2-pentanoyloxybariumsulfoterephthalate,
Dipentyl 5-propionoxymagnesiumsulfoisophthalate,
Dipentyl 2-pentanoyloxymagnesiumsulfoterephthalate,
Dipentyl 2-hexanoyloxycalciumsulfoterephthalate,
Dihexyl 2-acetoxybariumsulfoterephthalate,
Dihexyl 5-propionoxyberylliumsulfoisophthalate,
Dihexyl 5-butanoyloxyzincsulfoisophthalate,
Dihexyl 5-pentanoyloxystannoussulfoisophthalate,
Dipentyl 2-acetoxyzincsulfoterephthalate,
Dipentyl 5-butanoyloxyberylliumsulfoisophthalate,
Dipentyl 2-hexanoyloxystannoussulfoterephthalate,
Dipentyl 2-octanoyloxycalciumsulfoterephthalate,
Dioctyl 5-acetoxybariumsulfoisophthalate,
Dioctyl 5-isopropionoxystannoussulfoisophthalate,
Dioctyl 5-butanoyloxyzincsulfoisophthalate,
Dioctyl 2-pentanoyloxymagnesiumsulfoterephthalate,
Di-2-ethylhexyl 2-acetoxycalciumsulfoterephthalate,
Dioctyl 5-heptanoyloxystrontiumsulfoisophthalate,
Dinonyl 5-acetoxycalciumsulfoisophthalate,
Dinonyl 5-propionoxybariumsulfoisophthalate,
Dinonyl 2-pentanoyloxystannoussulfoterephthalate,
Dinonyl 2-hexanoyloxyzincsulfoterephthalate,
Didecyl 2-acetoxycalciumsulfoterephthalate,
Didecyl 2-propionoxybariumsulfoterephthalate,
Didecyl 5-butanoyloxystannoussulfoisophthalate,
Didecyl 5-heptanoyloxyzincsulfoisophthalate,
and the like.

Suitable diols for the production of the polyester of this invention are the aliphatic diols represented by the general formula $HO(CH_2)_nOH$ wherein $n$ is an integer of from 2 to about 10, such as ethylene glycol, trimethylene glycol, pentamethylene glycol, hexamethylene glycol, decamethylene glycol, and the like. Also suitable are 1,4-cyclohexanedimethanol, p-xylylene glycol, hydroquinone diacetate, 4-hydroxybenzyl alcohol, and the like. It is known that any glycol of an aliphatic nature, whether or not it contains aromatic nuclei, can be used in the production of linear polyesters. Thus, the term aliphatic glycol includes all those glycols of an aliphatic nature which are known to the art to be suitable.

The preferred dicarboxylic acid compounds for the production of the polyesters of this invention are the aromatic dicarboxylic acids, which are well known to those skilled in the art. The most preferred dicarboxylic acid is terephthalic acid and the dialkyl esters thereof, such as dimethyl terephthalate and similar esters in which the alkyl groups preferably contain from 1 to about 5 carbon atoms. Other suitable aromatic dicarboxylic acids or their esters which can be used are:

Isophthalic acid,
p,p'-Diphenylcarboxylic acid,
p,p'-Dicarboxydiphenyl ethane,
p,p'-Dicarboxydiphenyl hexane,
p,p'-Dicarboxydiphenyl sulfide,
p,p'-Dicarboxydiphenyl sulfone,
p,p'-Dicarboxydiphenyl ether,
p,p'-Dicarboxyphenoxy butane,
2,6-naphthalene dicarboxylic acid, and the like; and the alkyl esters thereof. Mixtures of two or more dicarboxylic acids can also be used. Up to about 20 percent by weight of the aromatic dicarboxylic acid can be replaced by an aliphatic acid or ester thereof, such as adipic acid, succinic acid, sebacic acid, dimethyl 1,2-eicosane dioate, and the like.

Further, linear polyesters can be produced by the self-condensation of a hydroxy acid or hydroxy ester with the sulfonated modifiers, as disclosed by this invention.

Thus, the linear polyesters of this invention contain the recurring units represented by the following general formulae:

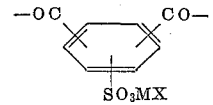

from the acyloxymetallosulfophthalate compounds;

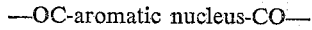

from the aromatic dicarboxylic acid compounds; and

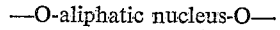

from the aliphatic glycols as defined above, wherein the recurring units are attached to one another by an ester link

At least about a 1.3:1 molar ratio of glycol to dicarboxylic acid compounds is used. However, an excess of glycol to dicarboxylic acids, ranging from about 2 to 10 moles of glycol per mole of dicarboxylic acid compounds can be used. A more satisfactory ratio is from about 1.3 to 7 moles, with ratios of from about 1.5 to about 5 moles of glycol per mole of dicarboxylic acid compounds preferred.

The amount of acyloxymetallosulfophthalate compound present in the modified linear polyesters of this invention can be varied from about 0.1 to about 10 mole percent or more. Amounts ranging from 0.15 to about 4 mole percent are preferred.

In producing the dyeable linear polyesters of this invention, the calculated amounts of aryl dicarboxylic acid compound, glycol, acyloxymetallosulfoisophthalate or acyloxymetallosulfoterephthalate, and catalyst are charged to a reactor and heated at a temperature of from about 150° C. to about 270° C., preferably from about 170° C. to about 250° C., in an inert atmosphere to effect the initial ester interchange reaction. Then whatever excess glycol is left is removed by heating to about 280° C. at reduced pressure in an inert atmosphere, or by passing a stream of an inert gas through the melt at atmospheric pressure. Thereafter the polycondensation is carried out at from about 225° C. to about 325° C., preferably from about 260° C. to about 290° C., and at reduced pressures of from about 0.1 mm. to about 20 mm. of mercury, preferably from about 0.1 mm. to about 5 mm., also in an inert atmosphere. If desired, the entire reaction can be carried out at atmospheric pressure while bubbling a stream of inert gas through the molten mixture; the rate of gas flow being increased as the polycondensation proceeds. The total reaction period can be from about 1 to about 12 hours, according to the catalyst employed and its concentration, the temperature, the pressure, the starting monomers, the viscosity desired for the polyester, et cetera, as is known in the art.

The monomers are preferably reacted in contact with suitable catalysts in order to shorten the reaction period and thus lessen the possibility of discoloration. Any of the well known polyesterification catalysts can be used, such as antimony oxide, zinc acetate, manganese acetate, cobaltous acetate, zinc succinate, zinc borate, magnesium methoxide, sodium methoxide, barium oxide, cadmium formate, litharge, dibutyltin oxide, tetraisopropyl titanate, calcium titanium silicate, and the like. The concentration of the catalyst can be varied from about 0.001 percent to about 1 percent by weight of the total amount of dicarboxylic acid compounds charged. A preferred amount is from about 0.005 percent to about 0.5 percent by weight; with the most preferred amount being from about 0.01 percent to about 0.2 percent by weight.

It was unexpected that the acyloxymetallosulfophthalate modifiers would have sufficient stability, both chemically and thermally, to withstand the polycondensation conditions in the presence of the other reactants, as well as the high temperatures necessary for spinning the polyesters. It was also surprising that the fibers produced from the modified polyesters of this invention showed no disadvantages in physical properties over the unmodified polyester fibers, and that they exhibited enhanced dyeability properties.

Other materials can be present in the reaction mixture, for example, color inhibitors, such as alkyl or aryl phosphite esters; or pigments, delusterants or other additives, such as titanium dioxide or barium carbonate.

The reduced viscosity, $I_R$, of the polyesters of this invention is determined by the equation:

$$I_R = \frac{\Delta N}{N_0} \times \frac{1}{C}$$

wherein $\Delta N$ is the difference between the flow time of the solution and the flow time of the solvent, $N_0$ is the flow time of the solvent, and C is the concentration of the polymer in grams per 100 milliliters of solution. The reduced viscosities reported in this application were obtained at a polymer concentration of 0.2 gram per 100 milliliters of solution using a 3:2 mixture of phenol and tetrachloroethane as the solvent. The reduced viscosity of the polyesters can vary from about 0.2 to about 3, with value from about 0.35 to about 1 preferred.

The fibers are dyed by conventional procedures known to the art, preferably from an aqueous solution at the boiling point of the dyebath. The cationic and disperse dyestuffs are most readily absorbed and produce deep shades. The amount of dye on a fiber, or the depth of color, is approximately proportional to the $K/S$ value which is a measure of the light reflected from the dyed sample. The larger the $K/S$ value, the deeper the shade; and a $K/S$ value of 20 is approximately twice as deep as a $K/S$ value of 10. The determination of the $K/S$ values is set forth in an article by D. B. Judd, Color in Business, Science and Industry, 1952, pages 314 to 342.

The polyesters produced by this invention can be melt spun to form filaments and yarns. Before melt spinning the modified polyester resins were dried overnight at 90° C. and a pressure of 2 mm. of mercury, and then melt extruded in a plunger type spinning machine at 280° C. to 285° C. using a spinnerette having 30 holes, each 0.015 inch in diameter. The orifice velocity was 3 feet per minute and the yarn was taken up at 150 feet per minute, a draw ratio of 50:1. The yarn was then hot stretched at 90° C. around an electrically heated pin to an extent of from 200 to 500 percent, and then continuously annealed at 150° C. over an electrically heated bar, allowing 10 percent relaxation. The yarns were then woven into fabrics and dyed. The spinning procedure used is conventional for polyesters, and is well known to the skilled person in the art.

The fabrics were dyed by conventional procedures in the absence of carriers or dye assistants. The dye baths used had a liquor to fiber bath ratio of 40:1 and contained 1 percent of the sodium sulfate derivative of 7-ethyl-2-methyl-undecanol-4 as emulsifier. The dye concentration was 3 percent based on the weight of the fabric.

Among the basic and disperse dyestuffs which readily dye the fibers produced from the polyesters of this invention one can mention the "Genacryl" dyes discussed on pages 432 to 433 of the American Dyestuff Reporter, volume 43, 1954, for example, Genacryl Red 6B (a basic dye of the quaternary ammonium type), Genacryl Pink G (Basic Red 13; Color Index No. 48015), Genacryl Blue 6G; Celliton Fast Red GGA Ex. Conc. (Disperse Red 17; Color Index No. 11210); Celliton Fast Blue AF Ex. Conc. (Color Index No. 61115); Fuchsine SBP (a basic dye of the triphenylmethane type); Fuchsine Conc. Basic Violet 14 (Color Index No. 12510); Methyl Violet 2B; Brilliant Blue 6G; Methylene Blue SP; Victoria Green WB (Color Index 657); Victoria Green (Basic Green 4; Color Index No. 42000); Rhodamine B (Color Index 749); Brilliant Green B (Color Index 662); Sevron Brilliant Red 4G; Maxilon Red BL; Basacryl Blue GL; and the like.

The acyloxymetallosulfophthaltes used as modifiers in this invention are produced by the reaction of a divalent metal salt of a monocarboxylic acid having the general formula $M(OOCR')_2$ with a sulfonated phthalic acid derivative of the formula:

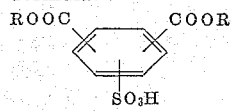

wherein R has the same meanings defined above.

Illustrative of the divalent metal acylates which can be used one can mention:

| | |
|---|---|
| Berryllium acetate, | Zinc benzoate, |
| Beryllium propionate, | Zinc caproate, |
| Beryllium butyrate, | Zinc nonanoate, |
| Beryllium octanoate, | Zinc formate, |
| Beryllium benzoate, | Strontium acetate, |
| Beryllium toluate, | Strontium pentoate, |
| Magnesium acetate, | Strontium formate, |
| Magnesium benzoate, | Strontium benzoate, |
| Magnesium laurate, | Strontium toluate, |
| Magnesium salicylate, | Barium acetate, |
| Calcium acetate, | Barium benzoate, |
| Calcium benzoate, | Barium butyrate, |
| Calcium butyrate, | Barium decanoate, |
| Calcium formate, | Stannous acetate, |
| Calcium isobutyrate, | Stannous propionate, |
| Calcium toluate, | Stannous benzoate, |
| Zinc acetate, | Stannous 2-ethylhexanoate, | et cetera.

Illustrative of the sulfonated phthalic acid derivatives are the following.

2-sulfoterephthalic acid,
5-sulfoisophthalic acid,
Dimethyl 2-sulfoterephthalate,
Dimethyl 5-sulfoisophthalate,
Diethyl 2-sulfoterephthalate,
Dipropyl 5-sulfoisophthalate,
Diisopropyl 2-sulfoterephthalate,
Dibutyl 2-sulfoterephthalate,
Dihexyl 2-sulfoterephthalate,
Dihexyl 5-sulfoisophthalate,
Dioctyl 2-sulfoterephthalate,
Di-2-ethylhexyl 2-sulfoterephthalate,
Didecyl 2-sulfoterephthalate,
Diisodecyl 2-sulfoterephthalate,
Didecyl 5-sulfoterephthalate,
and the like.

The sulfonated isophthalic and terephthalic acid compounds can be produced by known sulfonation procedures. Terephthalic acid and isophthalic acid are known to sulfonate by reaction with concentrated sulfuric acid or oleum to produce the monosulfonic acid derivatives.

The preferred sulfonation procedure is the reaction of the phthalic acid with oleum at a temperature of from about 150° C. to 300° C. for about one to fifteen hours, with reaction conditions between 200° C. to 270° C. for about two to ten hours preferable. The weight ratio of oleum to phthalic acid can vary from about 1:1 to about 5:1, with weight ratios of from about 2:1 to about 3.5:1 preferred. Advantageously, a sulfonation catalyst, such as mercury, mercuric sulfate, vanadium pentoxide, and the like, can be used, but its presence is not essential. Further one can sulfonate either the free phthalic acid or the esters thereof.

The acyloxymetallosulfophthalates used in this invention can be produced by heating a mixture of the sulfonated isophthalic or terephthalic acid compound and the divalent salt of a monocarboxylic acid. The reaction is preferably carried out using a large excess of the divalent metal acylate in the presence of a solvent. Suitable solvents are, for example, acetic acid, propionic acid, methanol, ethanol, benzene, toluene, hexane, heptane, cyclohexane, et cetera.

Preferably the divalent metal acylate is used in excess to ensure complete conversion and to prevent formation of metal disulfonate salt. However, from about 0.5, or less, to about 10 equivalents, or more, of the divalent metal acylate per equivalent of sulfonic acid radicals present in the sulfonated phthalic acid derivative can be charged. The reaction can be carried out at any convenient temperature, and is preferably conducted at temperatures of from about 50° C. to about 150° C., most preferably at the reflux temperature of the solvent used.

In a typical reaction a solution of magnesium acetate in methanol is added to a solution of dimethyl 5-sulfoisophthalate in methanol. The methanol is then distilled and replaced by acetic acid whereupon the desired dimethyl 2-acetoxymagnesiumsulfoisophthalate precipitates and is recovered. The substitution of beryllium butyrate for the magnesium acetate results in the production of dimethyl 2-butanoyloxyberylliumsulfoisophthalate.

The following examples further serve to define this invention but are not to be construed as limiting it thereto; parts are by weight unless otherwise specified.

EXAMPLE 1

A mixture of 136 grams of dimethyl terephthalate, 1.0032 grams of dimethyl 5-acetoxymagnesiumsulfoisophthalate (0.38 mole percent), 120 grams of ethylene glycol, 0.0685 gram of zinc acetate, and 0.0685 gram of magnesium acetate was charged to a reactor and heated at 180° C. for 6.5 hours, while distilling methanol formed during the reaction. The reaction mixture was heated at 240° C. for one hour to remove excess ethylene glycol, and then at 280° C. for eight hours while passing a vigorous stream of nitrogen through the melt to carry out the polycondensation. There was obtained a white polyester from the three monomers having a reduced viscosity of 0.64. Fibers produced from this polyester by conventional procedures were dyed with Sevron Brilliant Red 4G (Basic Red 14) to a medium red shade having a $K/S$ value of 1.9. A sample of unmodified poly(ethylene terephthalate) fabric dyed in the same manner was barely stained and had a $K/S$ value of 0.1, indicating that the fabric produced with the modified polyesters of this invention had a dye pickup about nineteen times as great.

EXAMPLE 2

A mixture of 160 grams of dimethyl terephthalate, 1.5483 grams of dimethyl 5-acetoxymagnesiumsulfoisophthalate (0.5 mole percent), 150 grams of ethylene glycol, 0.1292 gram of manganese acetate, and 0.0162 gram of antimony oxide was charged to a reactor and heated at 180° C. for 6.25 hours, while distilling methanol formed during the reaction. The reaction mixture was heated to 235° C. for one hour to remove excess ethylene glycol, and then at 280° C. for 7.75 hours while passing a vigorous stream of nitrogen through the melt to carry out the polycondensation. There was obtained a crystalline resin having a reduced viscosity of 0.46. The melting point was 243° C. to 245° C. Fibers produced from this polyester were dyed with Genacryl Pink G (Basic Red B; Part 2 ref. no. of C.I. 48015) to a medium pink shade and with Celliton Fast Red GGA Ex. Conc. (Disperse Red 17, C.I. 11210) to a deep red shade. In both cases no carrier was used. The $K/S$ value for the disperse dyeing was 15.1.

EXAMPLE 3

A mixture of 136 grams of dimethyl terephthalate, 1.995 grams of dimethyl 5-acetoxymagnesiumsulfoisophthalate (0.76 mole percent), 120 grams of ethylene glycol, 0.069 gram of zinc acetate, and 0.0138 gram of antimony oxide was charged to a reactor and heated for 6.25 hours at 180° C. while distilling methanol to bring about the ester exchange. The excess glycol was removed by distillation over a period of one hour. The polycondensation was carried out for six hours at 280° C. while passing a vigorous stream of nitrogen through the melt. The polyester obtained melted at 232° C. to 235° C. and had a reduced viscosity of 0.58. Fibers produced from this polyester were dyed with Genacryl Pink G (Basic Red 13, C.I. 48015) to a deep pink shade having a $K/S$ value of 3.2; with Celliton Fast Red GGA Ex. Conc. (Disperse Red 17, C.I. 11210) a very deep red shade was obtained having a $K/S$ value of 20.0. No carriers were used in either dyeing.

EXAMPLE 4

A mixture of 140 grams of dimethyl terephthalate, 1.4292 grams of dimethyl 5-acetoxyzincsulfoisophthalate (0.5 mole percent), 140 grams of ethylene glycol, 0.0283 gram of antimony oxide, 0.0424 gram of zinc acetate, and 0.0283 gram of manganese acetate was charged to reactor and heated to 180° C. for 1.5 hours while distilling methanol. The excess glycol was distilled out over a period of 1.5 hours while the reaction mixture was heated to 270° C. The polycondensation was performed for 6.75 hours between 260° C. and 270° C. The polyester obtained had a reduced viscosity of 0.55 and melted at 245° C. to 247° C. Fibers obtained from this polyester were dyed with Genacryl Pink G to a medium pink shade having a $K/S$ value of 2.0 and with Celliton Fast Red GGA Ex. Conc. to a very deep red shade having a $K/S$ value of 21.7. No carriers were used in the dyeings.

EXAMPLE 5

A mixture of 21.94 grams of dimethyl terephthalate, 1.1642 grams of dimethyl 5-acetoxyzincsulfoisophthalate (2.5 mole percent), 25 grams of ethylene glycol, 0.0046 gram of antimony oxide, 0.0069 gram of zinc acetate, and 0.0069 gram of manganese acetate was charged to a reactor and heated at 180° C. for three hours, while distilling methanol formed during the ester-exchange reaction. The reaction mixture was heated to 235° C. for 0.5 hour to remove excess ethylene glycol, and then at 255° C. to 270° C. for six hours while passing a vigorous stream of nitrogen through the melt to carry out the polycondensation. There was obtained a fiber-forming polyester which melted at 241° C. to 243° C. and had a reduced viscosity of 0.42.

EXAMPLE 6

A mixture of 140 grams of dimethyl terephthalate, 4.3273 grams of dimethyl 5-acetoxyzincsulfoisophthalate (1.5 mole percent), 140 grams of ethylene glycol, 0.0288 gram of antimony oxide, 0.0433 gram of zinc acetate, and 0.0288 gram of manganese acetate was charged to a reactor and heated at 180° C. for 4.25 hours, while distilling methanol formed during the reaction. The reaction mixture was heated to 260° C. over a period of 0.75 hour to remove excess ethylene glycol, and then 3.25 hours at 260° C. while passing a vigorous stream of nitrogen through the melt to carry out the polycondensation. A fiber-forming polyester was obtained which melted at 238° C. to 240° C. and had a reduced viscosity of 0.43.

EXAMPLE 7

A mixture of 194 grams of dimethyl terephthalate, 5.37 grams of dimethyl 5-benzoyloxybariumsulfoisophthalate (1 mole percent), 180 grams of ethylene glycol, 0.02 gram of antimony oxide, and 0.09 gram of zinc acetate was charged to a reactor and heated at 185° C. to 187° C. for four hours, while methanol formed in the ester-exchange reaction was distilled out. The reaction mixture was heated at 220° C. for two hours to remove excess ethylene glycol, and then at 270° C. to 280° C. for four hours while passing a vigorous stream of nitrogen through the melt to carry out the polycondensation. There was obtained a fiber-forming polyester which melted at 235° C. to 237° C. and had a reduced viscosity of 0.48.

EXAMPLE 8

A mixture of 194 grams of dimethyl terephthalate, 4.0168 grams of dimethyl 5-acetoxyzincsulfoisophthalate (1 mole percent), 180 grams of ethylene glycol, 0.02 gram of antimony oxide, and 0.09 gram of zinc acetate was charged to a reactor and heated at 185° C. for 3.25 hours while distilling methanol formed during the reaction. The reaction mixture was heated for two hours at between 220° C. and 260° C. to remove excess ethylene glycol, and then at 265° C. for 3.5 hours while passing a vigorous stream of nitrogen through the melt. The fiber-forming polyester obtained had a melting point of 232° C. to 234° C. and a reduced viscosity of 0.48. Fibers obtained from this polymer by melt-spinning were dyed with Genacryl Pink G to a medium deep pink shade having a $K/S$ value of 5.8, and with Celliton Fast Red GGA Ex. Conc. to a deep red shade having a $K/S$ value of 20.8. No carriers were used in the dyeings.

EXAMPLE 9

A mixture of 174.6 grams of dimethyl terephthalate, 18.04 grams of dimethyl isophthalate, 3.99 grams of dimethyl 5-benzoyloxybariumsulfoisophthalate (0.75 mole percent), 180 grams of ethylene glycol, 0.02 gram of antimony oxide, and 0.09 gram of zinc acetate was charged into a reactor and heated at 185° C. for 3.5 hours, while distilling methanol formed during the ester-exchange reaction. The reaction mixture was heated for two hours at between 220° C. and 260° C. to remove the glycol excess, and then at 260° C. to 280° C. for three hours. Nitrogen was passed through the melt at atmospheric pressure. There was obtained a polyester resin which had a reduced viscosity of 0.52. Fibers melt-spun from this polymer were dyed with Genacryl Pink G to a bright pink shade having a $K/S$ value of 1.5 and with Celliton Fast Red GGA Ex. Conc. to a very deep red shade having a $K/S$ value of 24.0. No carriers were used in the dyeings.

EXAMPLE 10

A mixture of 194 grams of dimethyl terephthalate, 3.025 grams of dimethyl 5-acetoxyzincsulfoisophthalate, 180 grams of ethylene glycol, 0.02 gram of antimony oxide, and 0.09 gram of zinc acetate was charged to a reactor and heated at 185° C. to 195° C. for 3.75 hours, while distilling methanol formed during the ester-exchange reaction. The mixture was heated for two hours at between 220° C. and 265° C. and for four hours to carry out the polycondensation. A stream of nitrogen was passed through the melt. The polyester obtained had a reduced viscosity of 0.48. Fibers melt-spun from this polymer were dyed with Genacryl Pink G to a medium pink shade, and with Celliton Fast Red GGA Ex. Conc. to a deep red shade. No carriers were used.

EXAMPLE 11

A mixture of 19.4 grams of dimethyl terephthalate, 1.0847 grams of dimethyl 5-benzoyloxybariumsulfoisophthalate (2 mole percent), 20 grams of ethylene glycol, 0.001 gram of antimony oxide, and 0.009 gram of zinc acetate was charged to a reactor and heated at 185° C. to 188° C. for four hours, while distilling methanol formed during the ester-exchange reaction. The mixture was heated for two hours at 220° C. to 222° C. to remove the excess glycol, and then at 270° C. to 280° C. for four hours to carry out the polycondensation. A stream of nitrogen was passed through the melt. The polyester obtained had a reduced viscosity of 0.47 and melted at 232° C. to 235° C.

EXAMPLE 12

A mixture of 19.4 grams of dimethyl terephthalate, 0.608 gram of dimethyl 2-butanoylcalciumsulfoterephthalate (1.5 mole percent), 20 grams of ethylene glycol, 0.002 gram of antimony oxide, and 0.009 gram of zinc acetate was charged to a reactor and heated at 185° C. to 188° C. for 3.3 hours, while distilling methanol formed during the reaction. The reaction mixture was heated to 223° C. for 1.75 hours to remove excess ethylene glycol, and then at 265° C. to 275° C. for 3.25 hours while passing a vigorous stream of nitrogen through the melt to carry out the polycondensation. There was obtained a crystalline resin with excellent fiber-forming and cold-drawing properties. The polymer had a reduced viscosity of 0.5 and melted at 240° C. to 244° C.

EXAMPLE 13

A mixture of 194 grams of dimethyl terephthalate, 2.52 grams of dimethyl 5-acetoxystrontiumsulfoisophthalate (0.6 mole percent), 180 grams of ethylene glycol, 0.02 gram of antimony oxide, and 0.09 gram of zinc acetate was charged to a reactor and heated at 183° C. to 189° C. for 3.75 hours to bring about the ester-exchange. The reaction mixture was then heated over a period of three hours to 270° C. to remove the glycol excess. This temperature was maintained for 4.5 hours to carry out the polycondensation. A vigorous stream of nitrogen was passed through the melt at atmospheric pressure during this time. The white, crystalline polymer obtained had a reduced viscosity of 0.62 and melted at 258° C. to 261° C. It was characterized by excellent fiber-forming and cold-drawing properties. Fibers produced from this polyester were dyed with Genacryl Pink G to a pink shade, and with Celliton Fast Red GGA Ex. Conc. to a medium red shade. No carriers were used.

EXAMPLE 14

A mixture of 194 grams of dimethyl terephthalate, 4.04 grams of dimethyl 2-butanoylcalciumsulfoterephthalate, 180 grams of ethylene glycol, 0.02 gram of antimony oxide, and 0.09 gram of zinc acetate was charged to a reactor and heated at 185° C. for about 4.5 hours, while distilling methanol formed during the reaction. The reaction mixture was heated to 230° C. for 1.5 hours to remove the excess glycol. The polycondensation was conducted at 270° C. for about five hours while passing a vigorous stream of nitrogen through the melt. The crystalline, tough polymer obtained had excellent fiber-forming and cold-drawing properties. It had a reduced viscosity of 0.7 and melted at 232° C. to 235° C. Fibers produced from this polyester were dyed with Genacryl Pink G to a medium pink shade having a $K/S$ value of 2.9, and with Celliton Fast Red GGA Ex. Conc. to a deep red shade having a $K/S$ value of 20.8.

EXAMPLE 15

A mixture of 19.4 grams of dimethyl terephthalate, 0.82 grams of bis(2-methylpentyl) 2-acetoxyzincsulfoterephthalate (1.5 mole percent), 20 grams of ethylene glycol, 0.002 gram of antimony oxide, and 0.009 gram of zinc acetate was charged to a reactor and heated at 185° C. for about 1.5 hours, while distilling methanol formed during the reaction. The reaction mixture was heated to about 260° C. to remove the excess glycol. The polycondensation was carried out at this temperature for 2.5 hours while passing a vigorous stream of nitrogen through the melt. The polyester obtained was fiber-forming and had a melting point of 250° C. to 253° C.

EXAMPLE 16

A mixture of 175 grams of dimethyl terephthalate, 7.7 grams of dimethyl 5-acetoxystrontiumsulfoisophthalate (2.0 mole percent), 170 grams of ethylene glycol, 0.017 gram of antimony oxide and 0.079 gram of zinc acetate was charged to a reactor and heated at 175° C. to 187° C. for 4.5 hours to bring about the ester-exchange reaction. The reaction mixture was then heated over a period of 3.75 hours to 270° C. to remove the glycol excess. The temperature was maintained between 272° C. and 280° C. for 4.75 hours to carry out the polycondensation during which a vigorous stream of nitrogen was passed through the melt at atmospheric pressure. The white, crystalline polymer obtained had a reduced viscosity of 0.56 and melted at 254° C. to 257° C. It was characterized by excellent fiber-forming and cold-drawing properties. Fibers melt-spun from this polymer were dyed with Genacryl Pink G and Celliton Fast Red GGA Ex. Conc. and had $K/S$ values of 2.0 and 13.3, respectively.

The following experiments illustrate the preparation of some of the acyloxymetallosulfophthalate modifiers used to produce the modified polyesters of this invention; similar procedures were used to produce the others.

Experiment 1

A one liter, 3-neck flask was equipped with an air condenser, stirrer, and thermometer, and it was then charged with 332 grams of isophthalic acid, 664 grams of 20 percent oleum, and 8 grams of mercury. The solution was stirred at 200° C. for seven hours, cooled overnight to room temperature, and slowly poured into 250 milliliters of water with agitation. After cooling, the precipitated 5-sulfoisophthalic acid was filtered. The solid acid was dissolved in 500 milliliters of hot water, decolorized with activated carbon black, filtered hot, and the hot filtrate was saturated with gaseous hydrogen chloride. On cooling, the recrystallized 5-sulfoisophthalic acid was filtered and then recrystallized a second time from concentrated aqueous hydrochloric acid. The highly purified acid was dried.

In a similar manner 2-sulfoterephthalic acid was produced.

Experiment 2

A five liter, 3-neck flask was equipped with a condenser, stirrer, and thermometer, and it was then charged with 465 grams of 5-sulfoisophthalic acid and 3.5 liters of methanol. The solution was heated at the reflux temperature for seventy-two hours. Thereafter, about 2.5 liters of methanol was distilled from the flask, replaced with fresh methanol, and the mixture was refluxed for an additional six hours. A small portion was removed, the methanol distilled therefrom, and dimethyl 5-sulfoisophthalate was recovered.

In a similar manner, di-n-butyl 5-sulfoisophthalate is produced using n-butanol instead of methanol.

Experiment 3

A solution of 100 grams of magnesium acetate tetrahydrate in 500 milliliters of methanol was placed in a flask equipped with a stirrer and a dropping funnel. Then 200 milliliters of the solution of dimethyl 5-sulfoisophthalate in methanol from Example 2 was added in a dropwise manner with agitation at the reflux temperature of the methanol mixture. After completion of the addition, most of the methanol was distilled from the flask using a steam bath. To the mixture remaining in the flask about 100 milliliters of acetic acid was added upon which dimethyl 5-acetoxymagnesiumsulfoisophthalate crystallized out and was recovered by filtration. The filtrate was poured into diethyl ether and a second crop of crystals was obtained. The crystals were combined and recrystallized from a hot mixture of acetic acid and water and then dried. On heating, the dimethyl 5-acetoxymagnesiumsulfoisophthalate was stable to 400° C. Microanalysis, calculated for $C_{12}H_{12}O_9SMg \cdot 2H_2O$: C, 36.7 percent; H, 4.11 percent. Found: C, 36.72 percent; H, 4.18 percent. Extensive drying at 240° C. and at 2 mm. pressure for three hours gave the anhydrous salt. Microanalysis, calculated for $C_{12}H_{12}O_9Mg$: C, 40.41 percent; H, 3.39 percent. Found: C, 40.17 percent; H, 3.44 percent.

In a similar manner, dimethyl 5-butanoyloxybariumsulfoisophthalate is produced by the reaction of barium butyrate and dimethyl 5-sulfoisophthalate. Also di-n-propyl 5-acetoxycalciumsulfoisophthalate is produced by the reaction of calcium acetate and di-n-propyl 5-sulfoisophthalate.

Experiment 4

Dimethyl 5-sulfoisophthalate, 82 grams, was dissolved in 300 milliliters of warm methanol. This solution was slowly added, at the reflux temperature, to 600 milliliters of a methanolic zinc acetate solution containing 132 grams of zinc acetate. Thereafter, the methanol was distilled on a steam bath. The reaction product remaining in the flask was dissolved in 750 milliliters of boiling acetic acid and filtered hot to remove the insoluble zinc acetate. On cooling the filtrate, dimethyl 5-acetoxyzincsulfoisophthalate precipitated. It was recrystallized twice again from acetic acid and dried. The diemthyl 5-acetoxyzincsulfoisophthalate was stable to 340° C.

What is claimed is:

1. A linear polyester consisting of the condensation product of (1) an aliphatic glycol containing from 2 to about 10 carbon atoms, (2) from about 0.1 to about 10 mole percent, based on the total amount of carboxylic acid compounds present, of an acyloxymetallosulfophthalate represented by the general formula:

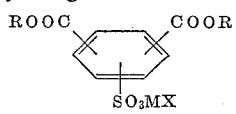

wherein R is a member selected from the group consisting fo a hydrogen atom, and an alkyl radical containing from 1 to above 10 carbon atoms; M is a divalent metal atom selected from the group consisting of beryllium, magnesium, calcium, zinc, strontium, barium, and tin; and X is an acyloxy radical of the formula —OCCR′, wherein R′ is a monovalent hydrocarbyl radical containing from 1 to about 15 carbon atoms, and (3) at least one different compound selected from the group consisting of the aromatic dicarboxylic acids and the dialkyl esters thereof.

2. A linear polyester consisting of the condensation product of dimethyl terephthalate, ethylene glycol, and from about 0.15 to about 4 mole percent, based on the total amount of carboxylic acid compounds present, of dimethyl 5-acetoxymagnesiumsulfoisophthalate.

3. A linear polyester consisting of the condensation product of dimethyl terephthalate, ethylene glycol, and from about 0.15 to about 4 mole percent, based on the total amount of carboxylic acid compounds present, of dimethyl 5-acetoxyzincsulfoisophthalate.

4. A linear polyester consisting of the condensation product of dimethyl terephthalate, ethylene glycol, and from about 0.15 to about 4 mole percent, based on the total amount of carboxylic acid compounds present, of dimethyl 5-benzoyloxybariumsulfoisophthalate.

5. A linear polyester consisting of the condensation product of dimethyl terephthalate, ethylene glycol, and from about 0.15 to about 4 mole percent, based on the total amount of carboxylic acid compounds present, of dimethyl 2-butanoylcalciumsulfoterephthalate.

6. A linear polyester consisting of the condensation product of dimethyl terephthalate, ethylene glycol, and from about 0.15 to about 4 mole percent, based on the total amount of carboxylic acid compounds present, of dimethyl 5-acetoxystrontiumsulfoisophthalate.

7. A heat stretched dye-receptive textile article of the class consisting of filaments, fibers, and yarns, composed of a linear polyester consisting of the condensation product of (1) an aliphatic glycol containing from 2 to about 10 carbon atoms, (2) from about 0.1 to about 10 mole percent, based on the total amount of carboxylic acid compounds present, of an acyloxymetallosulophthalate represented by the general formula:

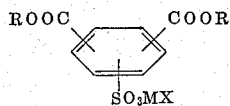

wherein R is a member selected from the group consisting of a hydrogen atom, and an alkyl radical containing from 1 to about 10 carbon atoms; M is a divalent metal atom selected from the group consisting of beryllium, magnesium, calcium, zinc, strontium, barium, and tin; and X is an acyloxy radical of the formula —OOCR', wherein R' is a monovalent hydrocarbyl radical containing from 1 to about 15 carbon atoms, and (3) at least one different compound selected from the group consisting of the aromatic dicarboxylic acids and the dialkyl esters thereof.

8. A heat stretched dye-receptive textile article of the class consisting of filaments, fibers, and yarns, composed of a linear polyester consisting of the condensation product of dimethyl terephthalate, ethylene glycol, and from about 0.15 to about 4 mole percent, based on the total amount of carboxylic acid compounds present, of dimethyl 5-acetoxymagnesiumsulfoisophthalate.

9. A heat stretched dye-receptive textile article of the class consisting of filaments, fibers, and yarns, composed of a linear polyester consisting of the condensation product of dimethyl terphthalate, ethylene glycol, and from about 0.15 to about 4 mole percent, based on the total amount of carboxylic acid compounds present, of dimethyl 5-benzoyloxybariumsulfoisophthalate.

10. A heat stretched dye-receptive textile article of the class consisting of filaments, fibers, and yarns, composed of a linear polyester consisting of the condensation product of dimethyl terephthalate, ethylene glycol, and from about 0.15 to about 4 mole percent, based on the total amount of carboxylic acid compounds present, of dimethyl 2-butanoylcalciumsulfoterephthalate.

References Cited by the Examiner
UNITED STATES PATENTS

| | | | |
|---|---|---|---|
| 3,018,272 | 1/62 | Griffing | 260—75 |
| 3,088,956 | 5/63 | Horn et al. | 260—429.9 |

FOREIGN PATENTS 549,179  7/56  Belgium.

WILLIAM H. SHORT, *Primary Examiner.*

P. E. MANGAN, LOUISE P. QUAST, *Examiners.*